United States Patent
Alriksson et al.

(10) Patent No.: US 10,856,246 B2
(45) Date of Patent: *Dec. 1, 2020

(54) USER EQUIPMENT AND METHOD FOR ESTIMATING AND UPDATING A TIMING OF A CELL IN A WIRELESS COMMUNICATIONS NETWORK

(71) Applicant: Telefonaktiebolaget LM Ericsson (publ), Stockholm (SE)

(72) Inventors: Peter Alriksson, Horby (SE); Robert Wolfgang Klang, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,649

(22) Filed: Jan. 20, 2019

(65) Prior Publication Data
US 2019/0230610 A1   Jul. 25, 2019

Related U.S. Application Data

(63) Continuation of application No. 15/037,768, filed as application No. PCT/EP2013/074488 on Nov. 22, 2013, now Pat. No. 10,219,237.

(51) Int. Cl.
*H04W 56/00* (2009.01)
*H04W 72/08* (2009.01)
(Continued)

(52) U.S. Cl.
CPC ....... *H04W 56/003* (2013.01); *H04W 56/005* (2013.01); *H04W 56/0015* (2013.01);
(Continued)

(58) Field of Classification Search
CPC .. H04W 56/003; H04W 56/005; H04W 88/08
See application file for complete search history.

(56) References Cited

U.S. PATENT DOCUMENTS 6,952,181 B2 * 10/2005 Karr ............... G01C 21/206
                                                       342/457
7,126,937 B2 * 10/2006 Crosbie ............. H04B 7/269
                                                        370/350
(Continued)

FOREIGN PATENT DOCUMENTS

EP       2063553 A1    5/2009
WO    2011044559 A1    4/2011
(Continued)

OTHER PUBLICATIONS

PCT International Search Report, dated Jan. 8, 2014, in connection with International Application No. PCT/EP2013/074488, all pages.
(Continued)

*Primary Examiner* — Andrew Lai
*Assistant Examiner* — Harry H Kim
(74) *Attorney, Agent, or Firm* — Leffler Intellectual Property Law, PLLC

(57) ABSTRACT

A method in a user equipment for updating a timing of a first cell is provided. The timing is the arrival time of a signal sent from a base station in the first cell relative to a clock in the user equipment in a wireless communication network. The user equipment measures a timing offset for the first cell and respective one or more second cells. When a quality of the timing offset measurement of the first cell is below a first threshold, the user equipment computes a timing offset estimate for the first cell based on the measured timing offset for the respective one or more second cells. The user equipment then updates the timing of the first cell based on the computed timing offset estimate.

10 Claims, 3 Drawing Sheets

(51) Int. Cl.
*H04W 88/02* (2009.01)
*H04W 88/08* (2009.01)

(52) U.S. Cl.
CPC .......... *H04W 72/085* (2013.01); *H04W 88/02* (2013.01); *H04W 88/08* (2013.01)

(56) References Cited

U.S. PATENT DOCUMENTS

| | | | |
|---|---|---|---|
| 2003/0220117 A1* | 11/2003 | Duffett-Smith | G01S 5/10 455/456.6 |
| 2010/0157885 A1* | 6/2010 | Koyanagi | H04W 36/30 370/328 |
| 2011/0098057 A1* | 4/2011 | Edge | G01S 5/0054 455/456.1 |
| 2011/0143770 A1* | 6/2011 | Charbit | G01S 5/0036 455/456.1 |
| 2011/0312339 A1 | 12/2011 | Kuningas et al. | |
| 2013/0176997 A1* | 7/2013 | Tian | H04W 56/005 370/336 |
| 2013/0242829 A1 | 9/2013 | Ge et al. | |
| 2013/0242861 A1* | 9/2013 | Abchuyeh | H04W 56/001 370/328 |

FOREIGN PATENT DOCUMENTS

| | | |
|---|---|---|
| WO | 2011063291 A1 | 5/2011 |
| WO | 2012100200 A2 | 7/2012 |
| WO | 2012173561 A2 | 12/2012 |

OTHER PUBLICATIONS

PCT Written Opinion, dated Jan. 8, 2014, in connection with International Application No. PCT/EP2013/074488, all pages.
3GPP TSG-RAN WG2 Meeting #79bis, R2-124419, Bratislava, Slovakia, Oct. 8-12, 2012, Time drift in HSDPA Multiflow, 2 pages.
3GPP TSG-RAN WG2 #79bis, R2-124653, Bratislava, Slovak Republic, Aug. 8-12, 2012, Timing Advance value initialization, 3 pages.
European Communication dated Feb. 7, 2018, in connection with European Application No. 13795728.8, 4 pages.
ETSI TS 136 214, V11.1.0, Feb. 2013, LTE; Evolved Universal Terrestrial Radio Access (E-UTRA); Physical layer; Measurements (3GPP TS 36.214 version 11.1.0 Release 11), 16 pages.

* cited by examiner

USER EQUIPMENT AND METHOD FOR ESTIMATING AND UPDATING A TIMING OF A CELL IN A WIRELESS COMMUNICATIONS NETWORK

CROSS-REFERENCE TO RELATED APPLICATIONS

This application claims the benefit of U.S. application Ser. No. 15/037,768 filed May 19, 2016 (371(c) date), which is a 35 U.S.C. § 371 national stage of international application PCT/EP2013/074488 filed Nov. 22, 2013. All of these earlier applications are hereby incorporated herein by reference in their entireties.

TECHNICAL FIELD

Embodiments herein relate to a user equipment, and a method therein. In particular, it relates to estimating and updating a timing of a cell in a wireless communication network.

BACKGROUND

Communication devices such as wireless terminals are also known as e.g. User Equipments (UE), mobile terminals and/or mobile stations. Wireless terminals are enabled to communicate wirelessly in a cellular communications network or wireless communication system, sometimes also referred to as a cellular radio system or cellular networks. The communication may be performed e.g. between two wireless terminals, between a wireless terminal and a regular telephone and/or between a wireless terminal and a server via a Radio Access Network (RAN) and possibly one or more core networks, comprised within the cellular communications network.

Wireless terminals may further be referred to as mobile telephones, cellular telephones, laptops, tablet computers or surf plates with wireless capability, just to mention some further examples. The wireless terminals in the present context may be, for example, portable, pocket-storable, hand-held, computer-comprised, or vehicle-mounted mobile devices, enabled to communicate voice and/or data, via the RAN, with another entity, such as another wireless terminal or a server.

The cellular communications network covers a geographical area which is divided into cell areas, wherein each cell area being served by an access node or a base station. A cell is the geographical area where radio coverage is provided by the base station or access node.

A wireless communication network may include a number of cells that can support communications for a number of user equipments. A user equipment may communicate with a serving cell and may need to make measurements of other cells for various purposes. For example, for a user equipment to be able to monitor and eventually perform a handover to a neighbour cell, a timing of the neighbour cell needs to be known or measured. A timing of a cell is here referred to as the arrival time of a signal sent from the base station in the cell relative to a clock in the user equipment. The timing of a cell may change due to a number of reasons, e.g. drift due to that the user equipment clock differs from the one used in the base station and drift due to a relative movement of the user equipment with respect to the base station. In order to adjust the timing of a cell, a time difference between the actual arrival time and expected arrival time of a signal sent from the base station in the cell is measured. The time difference hereafter is referred to as a timing offset of a cell.

In poor radio conditions producing a reliable measurement of the timing for all cells may not always be possible. Some cells may be heavily interfered by other cells or other disturbances which makes measurements of the timing offset unreliable. An erroneous correction of the timing of a cell may lead to that the user equipment loses the timing of the cell completely and thus have to reacquire the timing, using a cell search like method. This in turn will prevent it from measuring signal power etc. for that particular cell until the timing has been reacquired. In poor radio conditions this time may be considerable. The $3^{rd}$ Generation Partnership Project (3GPP) requirements for cell detection are typically 20 times longer than the reporting interval.

To prevent this, user equipments typically suppress timing corrections in case a timing offset estimate is deemed to be too unreliable. However, in case of large timing drifts, either due to discontinuous reception and/or high relative velocities between the user equipment and the base station, suppressing timing corrections for an extended period of time will also cause the user equipment to lose the timing of the cell.

SUMMARY

It is therefore an object of embodiments herein to improve a timing measurement for a cell in a user equipment.

According to a first aspect of embodiments herein, the object is achieved by a method in a user equipment for updating a timing of a first cell. The timing is the arrival time of a signal sent from a base station in the first cell relative to a clock in the user equipment in a wireless communication network. The user equipment measures a timing offset for the first cell and respective one or more second cells. When a quality of the timing offset measurement of the first cell is below a first threshold, the user equipment computes a timing offset estimate for the first cell based on the measured timing offset for the respective one or more second cells. The user equipment then updates the timing of the first cell based on the computed timing offset estimate.

According to a second aspect of embodiments herein, the object is achieved by a user equipment for updating a timing of a first cell. The timing is the arrival time of a signal sent from a base station in the first cell relative to a clock in the user equipment in a wireless communication network. The user equipment comprises a measuring circuit configured to measure a timing offset for the first cell and respective one or more second cells. The user equipment further comprises a computing circuit configured to compute a timing offset estimate for the first cell based on the measured timing offset for the respective one or more second cells, when a quality of the timing offset measurement of the first cell is below a first threshold. The user equipment further comprises an updating circuit configured to update the timing of the first cell based on the computed timing offset estimate, when said quality of the timing offset measurement of the first cell is below the first threshold.

Since the user equipment computes a timing offset estimate for the first cell based on the measured timing offset for the respective one or more second cells, the quality of the timing offset estimate of the first cell is improved. This is because the measured timing offset for the respective one or more second cells have higher quality than that of the first cell which has poor quality, thus an improved timing measurement for the first cell in a user equipment is provided.

An advantage of embodiments herein is that they provide reliable timing offset estimation for a cell, and reliable updating of the timing of the cell accordingly even in poor radio conditions and/or when the user equipment has high relative velocities to the base station in the cell. This enables the user equipment to stay in track of the cell such that handover, measuring signal power etc. activities can be performed successfully without reacquiring the timing of the cell by performing a cell search like method. Thereby extra time and power for performing cell detection is avoided, the power consumption of the user equipment is improved.

BRIEF DESCRIPTION OF THE DRAWINGS

Examples of embodiments herein are described in more detail with reference to attached drawings in which.

DETAILED DESCRIPTION

As part of developing embodiments herein, some problems will first be identified and discussed.

As described above in the background, the timing of a cell may change due to a number of reasons, e.g. drift due to that the user equipment clock differs from the one used in a base station and drift due to a relative movement of the user equipment with respect to the base station.

In the first case relating to drift due to that the user equipment clock differs from the one used in the base station, there is mainly a problem in discontinuous reception scenarios, for example, paging channel reception in Radio Resource Control Idle (RRC_IDLE) and Discontinuous Reception Transmission (DRX), in Radio Resource control Connected (RRC_CONNECTED). In a discontinuous reception scenario there are long periods when the user equipment cannot correct its oscillator frequency relative to the one of the base station. Because of this frequency discrepancy, the timing of neighbor and serving cell(s) will appear to drift.

During the long periods of no radio reception the user equipment will also try to enter a low power state during which a low accuracy oscillator is typically used. This will further contribute to the difference between the user equipment clock and the clock used in the base station. For this case the timing drift for all cells will be equal and follow the same trend due to the mismatch between the user equipment's clock and the reference clock in the base station. Base stations are required to have clocks that are within a certain range depending on the type of the base station to provide a time reference for user equipments.

In the second case, there is mainly a problem for high relative velocities between the base station and the user equipment. Due to the changing distance from the base station to the user equipment, the time of arrival of a signal sent from the base station will also change. The timing drift per second dT/dt, depends on the velocity v and the speed of light c as $dT/dt=v/c$. For example a speed towards the base station of 100 km/h would result in a drift of 92 ns/s.

Therefore embodiments herein provide a way for the user equipment to determine a neighbor cell's timing and update the timing of the cell. For example, the timing offset of each cell may be determined at certain intervals and the timing of the cell is updated accordingly.

Figure 1:
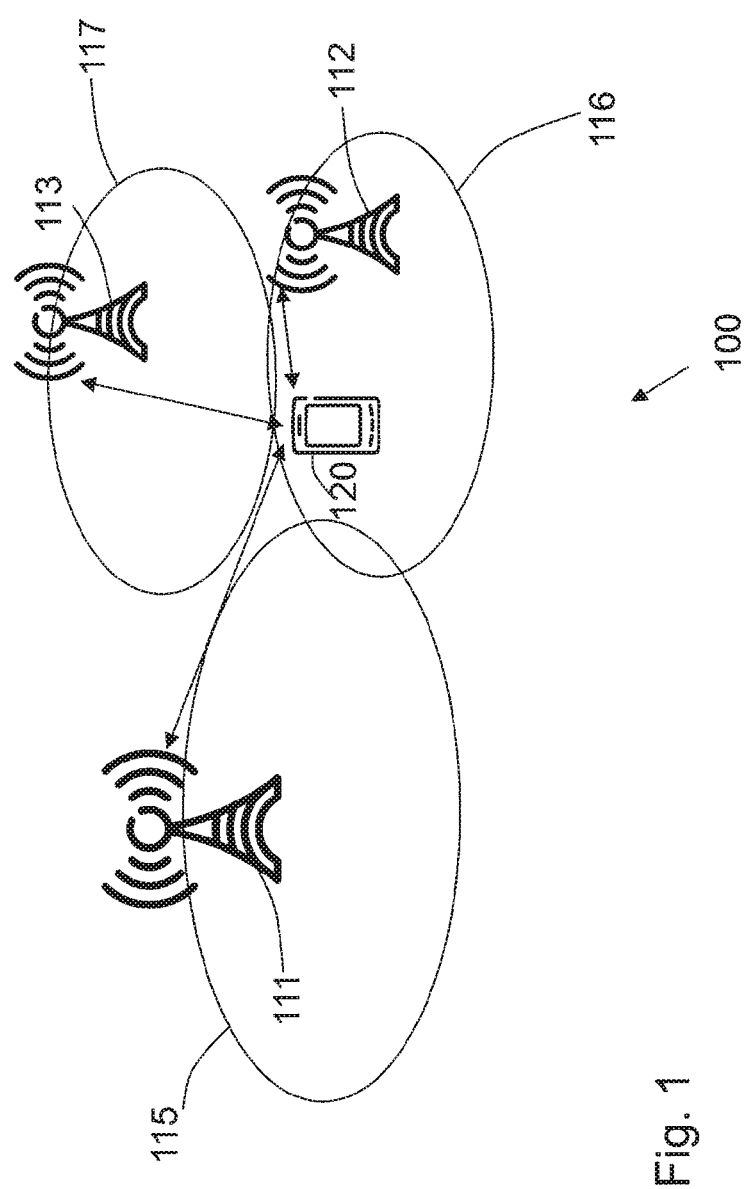
FIG. 1 is a schematic block diagram illustrating embodiments of a wireless communications network.

FIG. 1 depicts an example of a wireless communications network 100 in which embodiments herein may be implemented. The wireless communications network 100 is a wireless communication network such as an LTE, WCDMA, GSM network, any 3GPP cellular network, Wimax, or any cellular network or system.

The wireless communications network 100 comprises a plurality of network nodes whereof three, a first base station 111, a second base station 112, and a third base station 113 are depicted in FIG. 1. The first base station 111, the second base station 112 and the third base station 113 are network nodes which each may be, for example, an eNB, an eNodeB, or an Home Node B, an Home eNode B or any other network node capable to serve a user equipment or a machine type communication device in a wireless communications network. The first base station 111 serves a first cell 115, the second base station 112 serves a second cell 116 and the third base station 113 serves a third cell 117.

A user equipment 120 operates in the wireless communications network 100. The first base station 111, the second base station 112 and the third base station 113 may each be a transmission point for the user equipment 120. The user equipment 120 is within radio range of the first base station 111, the second base station 112 and the third base station 113, this means that it can hear signals from them.

The user equipment 120 may e.g. be a wireless device, a mobile wireless terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices.

Figure 2:
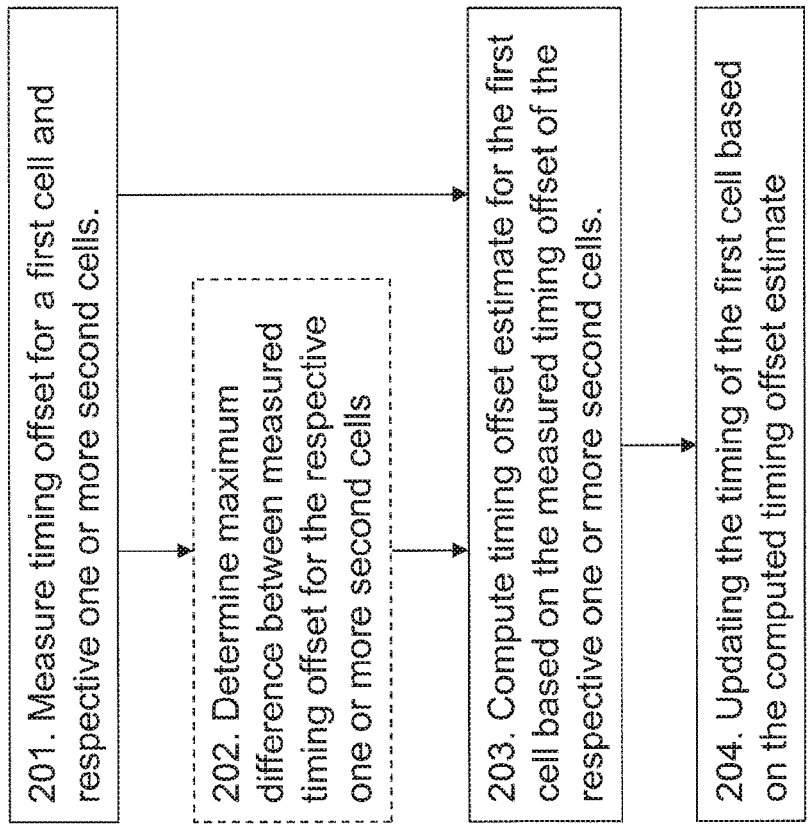
FIG. 2 is a flowchart depicting one embodiment of a method in a user equipment.

Example of embodiments of a method in the user equipment 120 for updating a timing of the first cell 115, will now be described with reference to FIG. 2. The timing is the arrival time of a signal sent from a base station in the first cell 115 relative to a clock in the user equipment 120 in the wireless communication network 100. The method comprises the following actions, which actions may be taken in any suitable order. Dashed lines of one box in FIG. 2 indicate that this action is not mandatory.

Action 201

The user equipment 120 measures a timing offset for the first cell 115 and respective one or more second cells 116, 117. This may be for the user equipment 120 to e.g. be able to perform a handover to a neighbour cell, such as the first cell 115, so the cell's precise timing needs to be known or measured.

Action 202

This action is optional. In some embodiments, the user equipment 120 determines a maximum difference between the measured timing offset for the respective one or more second cells 116, 117 whose quality of the measured timing offset being above a second threshold.

Action 203

When a quality of the timing offset measurement of the first cell 115 is below a first threshold, that means the timing offset measurement of the first cell 115 is not reliable, the user equipment 120 computes a timing offset estimate for the first cell 115 based on the measured timing offset for the respective one or more second cells 116, 117.

In some first embodiments, the respective one or more second cells is represented by a serving cell 116 of the user equipment 120. In these embodiments the computing of the timing offset estimate for the first cell 115 is based on the measured timing offset for the serving cell 116. In these first embodiments, the serving cell timing is for example maintained with higher accuracy than the timing for other cells, thus using its timing as an estimate for the timing of first cell 115 will produce a stable and reliable estimate. As long as the relative velocity between the second base station 112 in the serving cell 116 and the user equipment 120 is approximately the same as the relative velocity between the first base station 111 in the first cell 115 and the user equipment 120, the timing offset of the serving cell will be approximately the same as the timing offset for the first cell 115.

In some alternative second embodiments, wherein computing a timing offset estimate for the first cell 115 based on the measured timing offset for the respective one or more second cells 116, 117, further is based on computing a mean value of the measured timing offset for the respective one or more second cells 116, 117. In these second embodiments, the timing offset estimate for the first cell 115 may be computed as the mean value of the timing offset measurements of all other cells whose timing offset measurements are deemed reliable. Therefore, the user equipment 120 may compute the mean value of the measured timing offsets for the respective one or more second cells whose quality of the measured timing offset being above a second threshold.

Different embodiments may be used in different scenarios. Therefore a decision on which embodiment to use in a scenario, may first be taken. The decision may be based on a maximum difference between the measured timing offset for all cells whose timing offset measurements are deemed reliable, that is, the quality of the timing offset measurements for these cells exceeds the second threshold. Determining the maximum difference of the timing offset measurements has been performed in Action 202 above.

If this difference is small, that is, the maximum difference is below or equals to a third threshold, this means that different cells have a similar drift, which indicates that the relative velocity between the user equipment 120 and its base station 112 in the serving cell 116 is small. In such a situation the method in the first embodiment is used. Thus, when the determined maximum difference is below or equals to a third threshold, the user equipment 120 computes the timing offset estimate for the first cell 115 based on the measured timing offset for the serving cell 116.

If this difference is large, that is, the maximum difference exceeds the third threshold, this means that different cells do not have the same drift, which in turn indicates that the relative velocity between the user equipment 120 and its base station 112 is high. In such a situation the method in the second embodiment is used. Thus when the determined maximum difference exceeds a third threshold, the user equipment 120 computes the timing offset estimate for the first cell 115 based on computing the mean value of the measured timing offset for the respective one or more second cells 116, 117.

Action 204

The user equipment 120 updates the timing of the first cell 115 based on the computed timing offset estimate.

In conclusion, embodiments herein are based on that if no timing offset measurement is available or the measured timing offset is unreliable for a particular cell, a timing offset estimate for this particular cell can be derived or computed using timing offset measurements from a set of other cells whose quality of the measured timing offset is high. The user equipment 120 then updates the timing of the first cell 115 accordingly.

Figure 3:
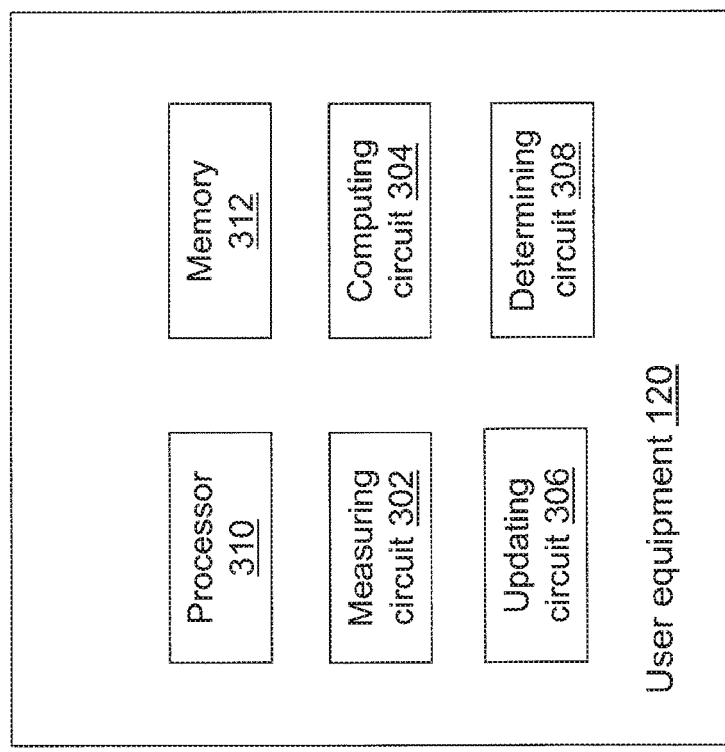
FIG. 3 is a schematic block diagram illustrating embodiments of a user equipment.

To perform the method actions in a user equipment 120 for updating a timing of a first cell 115 in a wireless communication network 100 described above in relation to FIG. 2, the user equipment 120 comprises the following circuits depicted in FIG. 3.

The user equipment 120 comprises a measuring circuit 302 configured to measure a timing offset for the first cell 115 and respective one or more second cells 116, 117.

The user equipment 120 further comprises a computing circuit 304 configured to compute a timing offset estimate for the first cell 115 based on the measured timing offset for the respective one or more second cells 116,117.

In some embodiments, the respective one or more second cells is represented by a serving cell 116 of the user equipment 120. In these embodiments, the computing circuit 304 may further be configured to compute the timing offset estimate for the first cell 115 based on the measured timing offset for the serving cell 116.

In some alternative embodiments, the computing circuit 304 is further configured to compute the timing offset estimate for the first cell 115 based on computing a mean value of the measured timing offset for the respective one or more second cells 116, 117.

In yet another embodiment, the computing circuit 304 is further configured to compute a mean value of the measured timing offset for the respective one or more second cells 116, 117 whose quality of the measured timing offset being above a second threshold.

The user equipment 120 further comprises an updating circuit 306 configured to update the timing of the first cell 115 based on the computed timing offset estimate, when said quality of the timing offset measurement of the first cell 115 is below the first threshold.

In yet another embodiment, the user equipment 120 comprises a determining circuit 308 configured to determine a maximum difference between the measured timing offset for the respective one or more second cells 116,117 whose quality of the measured timing offset being above a second threshold. When the determined maximum difference is below or equals to a third threshold, the computing circuit 304 is configured to compute the timing offset estimate for the first cell 115 based on the measured timing offset for the serving cell 116. When the determined maximum difference exceeds the third threshold, the computing circuit 304 is configured to compute the timing offset estimate for the first cell 115 based on computing the mean value of the measured timing offset for the respective one or more second cells 116,117.

The embodiments herein for updating a timing of a first cell 115 in a wireless communication network 100 may be implemented through one or more processors, such as a processor 310 in the user equipment 120, depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the user equipment 120. One such carrier may be in the form of a CD ROM disc. It is however feasible with other data carriers such as a memory stick. The computer program code may furthermore be provided as pure program code on a server and downloaded to the user equipment 120.

The user equipment 120 may further comprise a memory 312 comprising one or more memory units. The memory 312 is arranged to be used to store obtained information, timing offset measurements, estimated timing offset, data, configurations, and applications to perform the methods herein when being executed in the user equipment 120.

Those skilled in the art will also appreciate that measuring circuit 302, computing circuit 304, updating circuit 306 and determining circuit 308 described above may be referred to one circuit, a combination of analog and digital circuits, one or more processors configured with software and/or firmware and/or any other digital hardware performing the function of each circuit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a user equipment for updating a timing of a first cell, wherein the timing is the arrival time of a signal sent from a base station in the first cell relative to a clock in the user equipment, in a wireless communication network, the method comprising:
    operating the user equipment such that the user equipment is served by a serving cell in the wireless communication network;
    measuring one or more timing offsets for respective one or more second cells, wherein each of the one or more timing offset measurements is a difference between an actual arrival time of a received signal at the user equipment and an expected arrival time of the received signal;
    computing a timing offset estimate for the first cell based on the one or more timing offset measurements for the respective one or more second cells;
    updating the timing of the first cell based on the computed timing offset estimate.

2. The method of claim 1, wherein computing a timing offset estimate for the first cell is based on the one or more timing offset measurements for the serving cell.

3. The method according to claim 2, further comprising:
    determining a maximum difference between the one or more timing offset measurements for the respective one or more second cells whose quality of the timing offset measurements is above a second threshold;
    when the determined maximum difference is below or equals a third threshold, the computing of the timing offset estimate for the first cell is based on the one or more timing offset measurements for the serving cell;
    when the determined maximum difference exceeds a third threshold, the computing of the timing offset estimate for the first cell is based on computing the mean value of the one or more timing offset measurements for the respective one or more second cells.

4. The method of claim 1, wherein computing a timing offset estimate for the first cell is based on computing a mean value of the one or more timing offset measurements for the respective one or more second cells.

5. The method of claim 4, wherein computing a mean value of the one or more timing offset measurements for the respective one or more second cells is performed on the one or more second cells whose quality of the timing offset measurements is above a second threshold.

6. A user equipment for updating a timing of a first cell, wherein the timing is the arrival time of a signal sent from a base station in the first cell relative to a clock in the user equipment, in a wireless communication network, the user equipment comprising:
    an operating circuit configured to operate the user equipment such that the user equipment is served by a serving cell in the wireless communication network;
    a measuring circuit configured to measure one or more timing offsets for respective one or more second cells;
    a computing circuit configured to compute a timing offset estimate for the first cell based on the one or more timing offset measurements for the respective one or more second cells; and
    an updating circuit configured to update the timing of the first cell based on the computed timing offset estimate.

7. The user equipment of claim 6, wherein the computing circuit is further configured to compute the timing offset estimate for the first cell based on the one or more timing offset measurements for the serving cell.

8. The user equipment according to claim 7, further comprising:
    a determining circuit configured to determine a maximum difference between the one or more timing offset measurements for the respective one or more second cells whose quality of the timing offset measurements is above a second threshold; and
    wherein the computing circuit is further configured to compute the timing offset estimate for the first cell based on the one or more timing offset measurements for the serving cell of the user equipment, when the determined maximum difference is below or equals a third threshold; and
    wherein the computing circuit is further configured to compute the timing offset estimate for the first cell based on computing the mean value of the one or more timing offset measurements for the respective one or more second cells, when the determined maximum difference exceeds the third threshold.

9. The user equipment of claim 6, wherein the computing circuit is further configured to compute the timing offset estimate for the first cell based on computing a mean value of the one or more timing offset measurements for the respective one or more second cells.

10. The user equipment of claim 9, wherein the computing circuit is further configured to compute a mean value of the one or more timing offset measurements for the respective one or more second cells whose quality of the timing offset measurements is above a second threshold.

* * * * *